United States Patent [19]

Yu

[11] Patent Number: 4,850,247

[45] Date of Patent: Jul. 25, 1989

[54] Y TYPE PLANETARY GEARING

[76] Inventor: David Yu, 8855 Lavergne Ave., Skokie, Ill. 60077

[21] Appl. No.: 640

[22] Filed: Jan. 5, 1987

Related U.S. Application Data

[63] Continuation-in-part of Ser. No. 580,695, Feb. 16, 1984, abandoned.

[51] Int. Cl.[4] .............................................. F16H 3/44
[52] U.S. Cl. ......................................... 74/785; 74/801
[58] Field of Search ................. 74/785, 805, 768, 801, 74/457, 460, 462

[56] References Cited

U.S. PATENT DOCUMENTS

| | | | |
|---|---|---|---|
| 1,828,114 | 10/1931 | Hubbard | 74/462 |
| 1,998,891 | 4/1935 | Benson | 74/801 |
| 2,401,875 | 6/1946 | Lawler | 74/801 |
| 3,453,906 | 7/1969 | Ito | 74/801 |
| 3,675,510 | 7/1972 | Duggar, Jr. | 74/801 |
| 3,792,629 | 2/1974 | Applebury | 74/801 |
| 4,040,312 | 8/1977 | Tappan et al. | 74/801 |
| 4,043,226 | 8/1977 | Buuck | 74/801 |
| 4,280,376 | 7/1981 | Rosen | 74/801 |
| 4,336,727 | 1/1983 | Jonsson | 74/801 |
| 4,429,594 | 2/1984 | Heller | 74/785 |

OTHER PUBLICATIONS

"Analytical Mechanics of Gears", Earle Buckingham, pp. 1-3, 1949.

Primary Examiner—Leslie A. Braun
Assistant Examiner—David Novais
Attorney, Agent, or Firm—Robert J. Black

[57] ABSTRACT

A Y type planetary gearing consists basically of three central gears, a sun gear and two ring gears, and a number of identical planet gears. The three central gears have a common central axis and a number of teeth different from each other. Each planet gear has a uniform tooth profile in the longitudinal direction. The Y type planetary gearing of this invention has three important characteristics: (1) each planet gear is able to mesh simultaneously with the three central gears, (2) each pair of gears satisfy the law of conjugate gear-tooth action to provide uniform rotary motion, and (3) the planet gears are able to work properly without a carrier. Consequently, the disclosed Y type planetary gearing is compact in structure, small in size, low in cost, and capable of providing a high speed ratio.

10 Claims, 1 Drawing Sheet

Y TYPE PLANETARY GEARING

This application is a continuation-in-part of Serial No. 580,695, filed Feb. 16, 1984 now abandoned.

FIELD OF THE INVENTION

The invention relates to an improved Y-type planetary gear system.

BACKGROUND OF THE INVENTION

When a high speed ratio is required, a 3 central gears type planetary gearing (3C type) is a better candidate than a worm gearing or a multi-stage gear reducer. Although the terminology used here may be different from those in various patents and books, in this type of planetary gearing there are always three central gears having the same common central axis namely a centrally located sun gear and a pair of surrounding ring gears located side-by-side. One or more planet gears are disposed between the sun and ring gears. As a practical matter, the 3C type planetary gearing is a combination of two single planetary gearings, which enables the 3C type planetary gearing to obtain a high speed ratio with a compact structure.

Many patents from the 1940's (for example, U.S. Pat. No. 240,1875) to recent years (for example, Jansson U.S. Pat. No. 4,366,727 issued Jan. 4, 1983, Rosen U.S. Pat. No. 4,280,376 issued July 21, 1981, Buuck U.S. Pat. No. 4,043,226 issued Aug. 23, 1977 and Tappan U.S. Pat. No. 4,040,312 issued Aug. 9, 1977) have been based on the principle of the 3C type gearing. However, in prior art of this type, each planet gear is a stepped or double faced gear comprising two different sized gears to mesh with the two ring gears of different sizes, and a carrier is usually indispensable to such 3C type and all other types of planetary gearing. The angular position between the two different sized gears on each stepped planet gear must be accurate, otherwise not all the planet gears can be mounted in. It is very difficult to keep those angular positions during manufacture. The carrier may be the most expensive part since the holes on it should be accurately equally spaced for assembling the planet gears in position and there are two bearings and one shaft for supporting each planet gear, and bearings for supporting the carrier. Size and cost have become important indices of design. Whether each planet gear can have a uniform tooth profile in the longitudinal direction instead of the stepped gear and the carrier can be eliminated is of especial importance to the development of the planetary gearing.

For dynamic balance, a plurality of equally spaced planet gears is needed. If each planet gear is made of a uniform tooth profile in the longitudinal direction, it should be able to mesh with three central gears of different numbers of teeth, which may also incur different types of interference. When use only "one cylindrical planet gear" as claimed by Ito in U.S. Pat. No. 3,453,906, issued July 8, 1969, the chance of interference may be reduced. However, the mechanism is unbalanced, which results in a centrifugal force, uneven motion and noise. Therefore, "synthetic resin" gears are used to decrease "noise". The invention of using a number of "automatically floating" planet gears for sharing an "equalized load" is disclosed by Duggar Jr. in U.S. Pat. No. 3,675,510 issued July 11, 1972. The planet gears are "resiliently yieldable within the range of forces encountered in overcoming the interference fit at the time of initial assembly". However, he has not disclosed the following important questions: how much the initial interference fit should be applied at the time of assembly in order to make the planet gears float and take the equalized load at the time of working, how much the resilient yieldability the planet gears should have to overcome the interference fit, and how much additional torque and power should be increased to overcome the interference fit for making the gears to run. It might be very difficult to solve these questions, and this invention might be used for some special application, while power loss and uneven motion are of less importance. One of the fundamental requirements of gear-tooth action is to satisfy the basic law of gearing or law of conjugate gear-tooth action, which provides a uniform rotary motion by means of ger teeth. Not all the gears satisfy this law, for example the gears in either Ito or Duggar's invention. Meshing tooth by tooth, these gears can provide a constant average speed ratio. But during each revolution the speed ratio is changing resulting in uneven dynamic load, which has not been allowed in the most industrial use almost since last century after the law of conjugate gear-tooth action was formed in 1674. The unbalanced single planet gear in Ito's invention will cause a centrifugal force, which can become very large since this force is propotional to the product of the unbalanced mass and the square of velocity. Even if the gears are made of "synthetic resin" to decrease the mass and the velocity is supposed to be low, the unbalanced centrifugal force still changes the speed ratio during each revolution and the rotary motion can never be uniform. The resilient yieldable gears in Duggar's invention will change the tooth-form. Because once stress reaches yield point, the deformation is permanent and the original form can not be restored. In his invention "if more than one planet gear is used", then "the planet gears are stepped". Even if the stress is below the yield point and assume that the stepped planet gear can be modified to a gear with uniform tooth profile and the profile is correct (e.g. involute tooth profile), since the planet gears are "forceably inserted into mesh", the distorted tooth form can not satisfy the law of conjugation. Therefore, the gearing in either Ito or Duggar's invention might be used in some special cases, not for a general use, especially in industry.

SUMMARY OF THE INVENTION

A Y type planetary gearing of the invention comprises three coaxial central gears, a sun gear and two ring gears, and a plurality of identical planet gears. Each of the planet gears has a single uniform longitudinal tooth profile. The numbers of teeth of the three central gears are different from each other. Each of the planet gears can be freely assembled to mesh with the three central gears simultaneously and properly, which is achieved by correct geometry relations, not by interference insertion and yieldable deformation. Each pair of gears satisfies the law of conjugation to provide a uniform rotary motion. All the gears can be made of common industrial materials (not special yieldable materials), and have the same pressure angle and the same diametral pitch for the convenience of manufacture and general use in industry.

According to one aspect of the invention, if one of the three central gears is fixed, the other two are rotatable around the common central axis and can function as input and output. This Y type planetary gearing of the invention can thus be differently arranged to obtain up to six different speed ratios. If none of the three central gears are fixed and all of the three are rotatable around the common central axis, the gearing becomes a Y type differential gearing. Consequently, such a Y type planetary gearing of the invention is compact in structure, small in size, capable of obtaining a high speed ratio, and versatile in use.

BRIEF DESCRIPTION OF THE DRAWING

The invention will be described with reference to the accompanying drawing, wherein like numerals depict like elements, and.

DETAILED DESCRIPTION OF ILLUSTRATIVE EMBODIMENT

Figure 1:
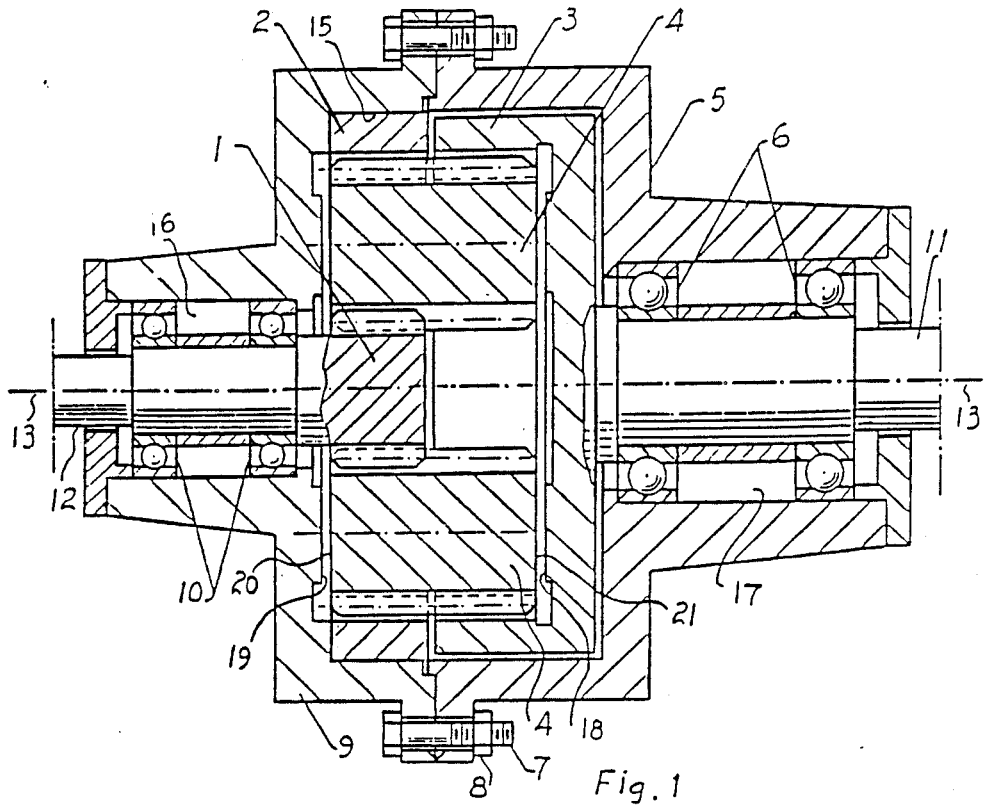
FIG. 1 is an axial sectional view through a Y type planetary gearing embodying the invention.

Referring to FIG. 1, an exemplary Y type planetary gearing according to the invention includes a sun gear 1, a first ring gear 2, and a second ring gear 3. The three gears have a common central axis 13 and are called central gears. For dynamic balance and sharing load, there is a plurality of identical planet gears 4, equiangularly positioned from each other on an orbit around the sun gear. The numbers of teeth of the three central gears are different from each other and are designated by $T_1$, $T_2$ and $T_3$. The number of teeth of each planet gear is the same and is designated by $T_4$. The two ring gears have internal involute tooth-form. The sun gear and the planet gears have external involute tooth-form.

First ring gear 2 is fixedly mounted, by interference fit or other method, in a bore or cylindrical chamber 15 of the left housing 9. It is also possible to cut the teeth of gear 2 on the housing if the structure is feasible. Sun gear 1 and shaft 12 are an integral part (or two parts joined together), which is rotatably mounted in a bore or cylindrical chamber 16 of housing 9 by bearings 10. Second ring gear 3 and a shaft 11 are an integral part (or two parts joined toghther), which is rotatably mounted in a bore or cylindrical chamber 17 of the right housing 5 by bearings 6. Bearings 6 and 10 shown in FIG. 1 are ball bearings, but other types of bearing or support can also be used. Left housing 9 is joined together with right housing 5 by bolts 7 and nuts 8 or by other method. Therefore, either reference numeral 5 or 9 represents a housing or a stationary part.

Figure 2:
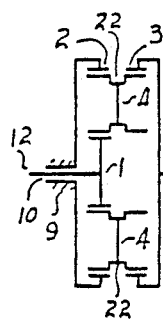
FIG. 2 is a schematic drawing of a Y type planetary gearing in which the first ring gear is fixed.
Figure 3:
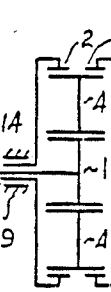
FIG. 3 is a schematic drawing of a Y type planetary gearing in which the second ring gear is fixed.
Figure 4:
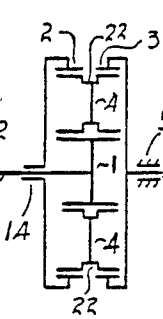
FIG. 4 is a schematic drawing of a Y type planetary gearing in which the sun gear is fixed.
Figure 5:
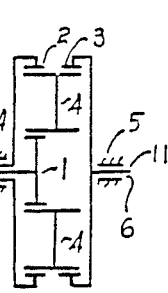
FIG. 5 is a schematic drawing of a Y type planetary gearing with all three central gears rotatable to provide Y type differential gearing.

FIGS. 2, 3, 4 and 5 schematically illustrate different arrangements. The small oblique parallel lines indicate a housing or stationary part. In FIGS. 2, 4 and and 5, the outside part of bearing 6 is fixedly mounted in housing 5 and shaft 11 can rotate inside bearing 6. In FIG. 2 first ring gear 2 is fixed to housing 9, bearing 10 is fixedly mounted in housing 9, and shaft 12 can rotate inside bearing 10. In FIGS. 3 and 5, reference numeral 14 is a bearing fixedly mounted in the first ring gear 2 and shaft 12 can rotate inside bearing 14. In FIG. 4 sun gear 1 with shaft 12 is fixed to housing 9, bearing 14 is fixedly mounted in first ring gear 2, and bearing 14 with ring gear 2 can rotate around shaft 12. In FIGS. 3 and 5, bearing 10 is fixedly mounted in housing 9 and by means of bearing 10 ring gear 2 is rotatable.

Each of planet gears 4 can mesh with the three central gears 1, 2 and 3. In the middle of each planet gear there is no teeth mesh with the two ring gears since there is clearance between them. As shown in FIGS. 2 and 4, a groove 22 might be cut in the middle of planet gears 4. Whether or not there is the groove, the tooth profile is uniform in the direction parallel to the central axis of each planet gear or in the longitudinal direction. In other words, each planet gear is not a stepped, nor double faced gear. Since its left end portion is in mesh with the first ring gear and its right end portion is in mesh with the second ring gear, each planet gear can also be specified as having two opposite end portions. Sun gear 1 may have either a short face width in mesh with one end portion of each planet gear 4 (as in FIGS. 1, 2 and 5), or a long face width in mesh with both end portions (as in FIGS. 3 and 4).

The reason that the Y planet gearing can work properly without a carrier (as shown) in order to reduce size and simplify structure is based on the following two principles.

First, there are three members in the Y gearing having relations with the outside: sun gear 1 and second ring gear 3 as the input and the output, or vice versa, and first ring gear 2 connected to a stationary part. If take the Y gearing as a free body, there are only three moments or torques acting on the three members. They should be in equilibrium, or $$M_1 + M_2 + M_3 = 0$$

where $M_1$, $M_2$ and $M_3$ are torques acting on gears 1, 2 and 3, respectively.

Even if there is a carrier, it will not transmit torgue.

Secondly, since the planet gears are more than one and are equally spaced, the forces acting on them are in equilibrium by themselves.

Therefore, the carrier can be eliminated, and the planet gears are engaged only by the three central gears and otherwise unsupported by any carrier.

Usually there is no axial force acting on the planet gears. In case the gearing is not in a horizontal position, the weight of the planet gears might cause some axial movement. Therefore, means is required to limit such a movement, but not to hinder the planet gears from rotating. One of the methods is simple and shown in FIG. 1. The axial movement of the planet gears is limited by inner wall 18 on second ring gear 3 and inner wall 19 on left housing 9. There are also a clearance between wall 18 and right end face 21 of planet gear 4 and a clearance between wall 19 and left end face 20 of planet gear 4. Then the rotation of planet gear 4 will not be hindered.

Besides no carrier, the other important features of the Y gearing are that each of planet gears 4 can mesh with the three central gears 1, 2 and 3 simultaneously and properly, and each pair of gears can satisfy the law of conjugate gear-tooth action to transmit uniform rotary motion.

The law of conjugate gear-tooth action or the basic law of gearing can be expressed as follows:

To transmit uniform rotary motion from one shaft to another by means of gear teeth, the common normal to the profiles of these teeth at all points of contact must pass a fixed point on the center line of the two shafts.

The common normal to two meshing profiles of a pair of involute gear teeth at all points of contact is the common tangent to the two base circles of the two involute gears and this tangent passes only one point, i.e. pitch point, on the center line of the two gears. Therefore, the involute gears can satisfy the law of conjugate gear-tooth action.

If all the gears are involute gears and have the same pressure angle $\phi$ and the same diametral pitch P, from ordinary designs there will be three (at least two) different center distances for three pairs of gears, i.e. gears 1 and 4, gears 2 and 4, and gears 3 and 4. For example, $\phi = 20°$, $P = 16$, $T_1 = 24$, $T_2 = 93$, $T_3 = 90$ and $T_4 = 34$, then the three center distances are:

$C_1 = 0.5(T_1 + T_4)/P = 0.5(24 + 34)/16 = 1.8125$ in.

$C_2 = 0.5(T_2 - T_4)/P = 0.5(93 - 34)/16 = 1.8438$ in.

$C_3 = 0.5(T_3 - T_4)/P = 0.5(90 - 34)/16 = 1.7500$ in.

However, in each of the three pairs, one gear is the same gear, planet gear 4, and the other three gears are central gears and have the same central axis, therefore, there can be only one center distance.

The following basic relation of the Y gearing provides a possibility for the three pairs of gears to have a common center distance and to satisfy the law of conjugate gear-tooth action.

$(T_1 + T_4) \cos \phi/(P \cos \phi_1) = (T_2 - T_4) \cos \phi/(P \cos \phi_2) = (T_3 - T_4) \cos \phi/(P \cos \phi_3) = 2C$ where: C is the common center distance, $\phi_1$ is the working pressure angle between sun gear 1 and each of planet gears 4, $\phi_2$ is the working pressure angle between first ring gear 2 and each of planet gears 4, and $\phi_3$ is the working pressure angle between second ring gear 3 and each of planet gears 4.

The base circle is $r_b = r \cos \phi = (0.5T/P) \cos \phi$ where: $r_b$ is the base radius and r is the pitch radius.

Once we have chosen diametral pitch (e.g. $P = 16$), pressure angle (e.g. $\phi = 20°$), and the teeth of gears, the base circles are determined.

Figure 6:
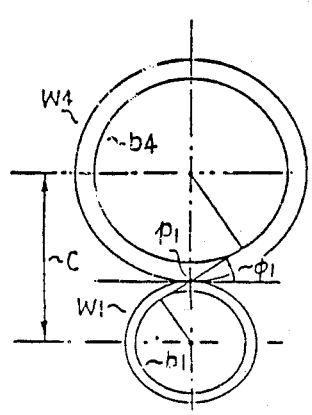
FIG. 6 is a schematic drawing depicting the three pairs of gears of a Y type planetary gearing having a common center distance.
Figure 6:
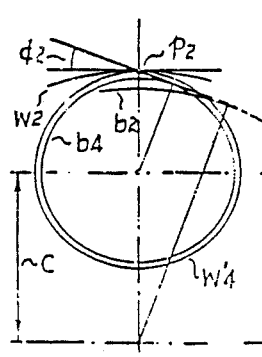
Figure 6:
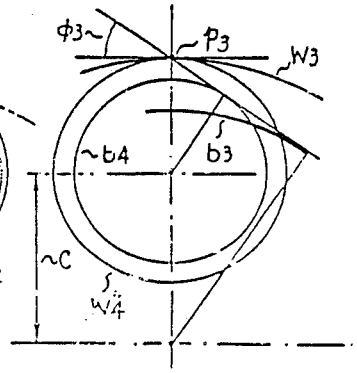

In the above example, suppose using $C = 1.82$ in. as the common center distance and choose the pair of sun gear 1 and planet gear 4 for illustration (as in FIG. 6). Since the base circles have been determined, a common tangent can be drawn to them, which intersects the center distance line at pitch point $p_1$. Through $p_1$ two new pitch circles or working pitch circles $r_{w1}$ and $r_{w4}$ can be determined. The angle between the common tangent to the two base circles and the common tangent to the two working pitch circles is the new pressure angle called working pressure angle $\phi_1$.

Since $r_{w1} = r_{b1}/\cos \phi_1$ and $r_{w4} = r_{b4}/\cos \phi_1$, and $r_{b1} = (0.5T_1/P)\cos \phi$ and $r_{b4} = (0.5T_4/P)\cos \phi$, then $r_{w1} = (0.5T_1/P)(\cos \phi/\cos \phi_1) = (0.5T_1 \cos \phi)/(P \cos \phi_1)$ $r_{w4} = (0.5T_4/P)(\cos \phi/\cos \phi_1) = (0.5T_4 \cos \phi)/(P \cos \phi_1)$ and $C = r_{w1} + r_{w4} = 0.5(T_1 + T_4)\cos \phi/(P \cos \phi_1)$ -continued or $2C = 2(r_{w1} + r_{w4}) = (T_1 + T_4)\cos \phi/(P \cos \phi_1)$ Therefore, the basic relation of the Y gearing expresses that the sum (for external gearing), or the difference (for internal gearing) of the two working pitch diameters of each of the three pairs of gears should be equal to twice the common center distance 2C.

The law of conjugation is for a pair of gears to provide uniform rotary motion, or to define a correct pitch point, a correct pressure angle and a correct pitch circle for each gear. The new idea of the basic relation of the Y gearing is to apply the law of conjugation to three pairs of gears of a special case so that each planet gear may have three (at least two) pitch points, three (at least two) working pressure angles and three (at least two) working pitch circles, while all the gears have the same standard pressure angle and the same diametral pitch for the convenience of manufacture. Therefore, it is possible to adjust the design paramters for satisfying the basic relation in order to obtain a common center distance for all the three pairs of gears. In the above example, there are three different working pressure angles, $\phi_1 = 20.639°$, $\phi_2 = 17.8326°$ and $\phi_3 = 25.3712°$, three working pitch radii for the three central gears, $r_{w1} = 0.7531$ in., $r_{w2} = 2.8688$ in. and $r_{w3} 32\ 2.9250$ in., three working pitch radii for each of the planet gears, $r_{w4} = 1.0669$ in., $r'_{w4} = 1.0488$ in. and $r''_{w4} = 1.1050$ in., and the relation $r_{w1} + r_{w4} = r_{w2} - r'_{w4} = r_{w3} - r''_{w4} = C$, as schematically shown in FIG. 6, wherein: reference letters $b_1$, $b_2$, $b_3$ and $b_4$ are the base circles of gears 1, 2, 3 and 4, respectively, reference letters $w_1$, $w_2$ and $w_3$ are the working pitch circles of gears 1, 2 and 3, respectively, reference letters $w_4$, $w'_4$ and $w''_4$ are the three working pitch circles of gear 4, reference letters $\phi_1$, $\phi_2$ and $\phi_3$ are the three working pressure angles, reference letters $p_1$, $p_2$ and $p_3$ are the three pitch points, and reference letter C is the common center distance.

Based on the law of conjugation the basic relation of the Y gearing also make each pair of gears satisfy this law, which can be proved as follows.

Since all the base circles remain unchanged, each pair of gears can still have a common tangent to the two base circles or a common normal to the two contact involute profiles at any point of contact, and this common normal always intersects the center line at a fixed point, therefore, each pair of gears satisfies the law of conjugation and provides uniform rotary motion.

Since the common center distance is not the standard center distance for each pair of gears, the tooth addenda should not be the standard either, or be modified, longer or shorter than the standard addendum. However, excessive lengthening of addendum can cause interference and excessive shortening of it can reduce the contact ratio. The working pressure angle also affects both contact ratio and interference. Therefore, each pair of gears must have a contact ratio at least larger than 1 to provide a continuity of meshing of teeth and to avoid uneven motion, and must not have any interference during assembly and running. If those requirements can not be satisfied, the design parameters should be changed, including the common center distance, and calculate again. To keep some unnecessary conditions, e.g. equal inside diameters of the two ring gears, standard radial clearance between teeth, etc., may incur interference, unsatisfied contact ratio and other problem.

There are also other parts in the Y gearing, which are of less importance to the present invention and will not be mentioned. It might be a common knowledge for gear design that adequate teeth backlash should be provided through manufacturing tolerances and gear tooth strength and durability should be checked.

If the relation among the number of teeth of the gears is incorrect, the planet gears can not be freely mounted in, which is another type of interference. To avoid the interference the following equations should be satisfied:

$$(T_1+T_2)/G = I_1$$

$$(T_2-T_3)/G = I_2$$

where G is the number of planet gears 4, and $I_1$ and $I_2$ are intergers. For example, if $T_1$, $T_2$ and $T_3$ are 24, 93 and 90, respectively, and $G=3$, then $I_1=39$ and $I_2=1$, which means that it is possible to use three equally spaced planet gears.

The angular velocities of the three central gears 1, 2 and 3 are designated by $N_1$, $N_2$ and $N_3$, respectively. If the first ring gear 2 is fixed, i.e. $N_2=0$, and the sun gear 1 and the second ring gear 3 are rotatable as shown in FIGS. 1 and 2, then sun gear 1 can be used as the input and second ring gear 3 as the output, and vice versa. The angular speed ratios of the two rotatable gears will be:

$$R_{13} = N_1/N_3 = (T_1T_3+T_2T_3)/(T_1T_3-T_1T_2)$$

$$R_{31} = N_3/N_1 = 1/R_{13}$$

If the second ring gear 3 is fixed, i.e. $N_3=0$, and the sun gear 1 and the first ring gear 2 are rotatable as shown in FIG. 3, then the two rotatable gears are the input and the output. The angular speed ratios of them will be:

$$R_{12} = N_1/N_2 = (T_1T_2+T_2T_3)/(T_1T_2-T_1T_3)$$

$$R_{21} = N_2/N_1 = 1/R_{12}$$

If the sun gear 1 is fixed, i.e. $N_1=0$, and the two ring gears 2 and 3 are rotatable as shown in FIG. 4, then the two ring gears are the input and the output. The angular speed ratios of them will be:

$$R_{23} = N_2/N_3 = (T_1T_3+T_2T_3)/(T_1T_2+T_2T_3)$$

$$R_{32} = N_3/N_2 = 1/R_{23}$$

If all the central gears 1, 2 and 3 are rotatable as shown in FIG. 5, a Y type differential gearing will be provided. The relation among the three rotatable central gears is as follows:

$$(N_1-N_2)/(N_3-N_2) = (T_1T_3+T_2T_3)/(T_1T_3-T_1T_2)$$

The concept of the Y gearing is also valid for toothform other than involute, such as cycloidal curve, however, the above basic relation of the Y gearing should be modified. Otherwise, the gears may not satisfy the law of conjugation even if the gearing can run.

It should be understood that although specific embodiments of the invention are described herein, such description is for the purposes of illustration only, and modifications thereof will become apparent to those skilled in the art within the scope of the invention.

I claim:

1. A gear assembly, comprising:

a housing;

a sun gear having external teeth, rotatably mounted in said housing;

a plurality of identical planet gears each having the same number of external teeth at opposite end portions thereof in meshed, non-interfering engagement with said sun gear and equally spaced from each other in a common orbit around said sun gear, said planet gears each having a uniform tooth profile in the longitudinal direction thereof;

an externally mounted first ring gear, having internal teeth thereof in meshed, non-interfering engagement with one of said end portions of each of said planet gears;

and an externally mounted second ring gear, having internal teeth thereof in meshed, non-interfering engagement with the other end portion of each of said planet gears, said sun gear, first ring gear and second ring gear having a common central axis and a different number of teeth from each other;

and said sun gear, ring gears and planet gears configured according to the relation:

wherein C is the common center distance, $T_1$, $T_2$, $T_3$ and $T_4$ are the numbers of teeth respectively of said sun gear, first ring gear, second ring gear and each of said planet gears, $\phi$ is the pressure angle, P is the diametral pitch, $\phi_1$ is the working pressure angle between said sun gear and each of said planet gears, $\theta_2$ is the working pressure angle between said first ring gear and each of said planet gears, and $\theta_3$ is the working pressure angle between said gears;

$$(T_1+T_4) \cos\phi/(P\cos\phi_1) = (T_2-T_4).$$

$$\cos\phi/(P\cos\phi_2) = (T_3-T_4).$$

$$\cos\phi/(P\cos\phi_3) = 2C.$$

2. The gear assembly of claim 1, wherein all of said gears are involute gears and have the same pressure angle and the same diametral pitch.

3. The gear assembly of claim 1, wherein the numbers of teeth of said sun gear, first ring gear and second ring gear satisfy the equations:

$$(T_1+T_2)/G = I_1$$

$$(T_2-T_3)/G = I_2$$

wherein $T_1$, $T_2$ and $T_3$ are the numbers of teeth of said sun gear, first ring gear and second ring gear, respectively, G is the number of said planet gears, and $I_1$ and $I_2$ are integers.

4. The gear assembly of claim 1, wherein each pair of gears has a contact ratio of at least larger than 1.

5. The gear assembly of claim 1, wherein said gear assembly comprises a Y type planetary gearing further comprising:

means for fixedly securing said first ring gear to said housing;

means for supporting said second ring gear rotatably about said common central axis and for transmitting torque and force;

means for supporting said sun gear rotatably about said common central axis and for transmitting torque and force; and means for limiting the axial movement of each of said planet gears.

6. The gear assembly of claim 1, wherein said gear assembly comprises a Y type differential gearing further comprising:
   means for supporting said sun gear rotatably about said common central axis and for transmitting torque and force;
   means for supporting said first ring gear rotatably about said common central axis and for transmitting torque and force;
   means for supporting said second ring gear rotatably about said common central axis and for transmitting torque and force; and
   means for limiting the axial movement of each of said planet gears.

7. The gear assembly of claim 1, wherein said sun gear, ring gears and planet gears have a substantially cylindrical shape.

8. The gear assembly of claim 1, wherein each of said planet gears has a pair of opposite end faces, and said end faces are closely confined between an inner wall of said housing and an inner wall of said second ring gear.

9. The gear assembly of claim 1, wherein there is further included Y planet gearing comprising said sun gear, said first ring gear and said second ring gear;
   said planet gearing operated on a carrierless basis whereby the size and structure of said gear assembly is substantially reduced in size and simplified in structure.

10. A gear assembly, comprising:
   a housing having a bore extending therethrough, said bore including a rear opening substantially cylindrical chamber, a front opening substantially cylindrical chamber, and a middle opening substantially cylindrical chamber, between said front and rear chambers and having a greater diameter than either said front chamber or said rear chamber;
   a first shaft extending through said front chamber and rotatably disposed in said front chamber and said middle chamber, said first shaft having a sun gear disposed thereon for unison rotation therewith within said middle chamber;
   a first ring gear fixedly secured to said housing in said middle chamber coaxial with said sun gear;
   a second shaft extending through said rear chamber and rotatably disposed in said rear chamber and said middle chamber;
   a second ring gear rotatably disposed within said middle chamber adjacent said first ring gear and coaxial with said sun gear;
   means rigidly securing said second ring gear to said second shaft for unison rotation therewith;
   a plurality of identical planet gears disposed in meshed, non-interfering engagement with said sun gear and both of said ring gears, in a common orbit around said sun gear equiangularly from each other, each of said planet gears having a substantially uniform tooth profile along a lengthwise direction thereof, a front end portion engaging said first ring gear and a rear end portion engaging said second ring gear;
   means spaced from said planet gears closely confining end faces of said planet gears to prevent axial movement thereof;
   and said sun gear, ring gears and planet gears configured according to the relation;
   wherein C is the common center distance, $T_1$, $T_2$, $T_3$ and $T_4$ are the numbers of teeth respectively of said sun gear, first ring gear, second ring gear and each of said planet gears, $\phi$ is the pressure angle, P is the diametral pitch, $\phi_1$ is the working pressure angle between said sun gear and each of said planet gears, $\phi_2$ is the working pressure angle between said first ring gear and each of said planet gears, $\phi_3$ is the working pressure angle between said second ring gear and each of said planet gears $$(T_1+T_4) \cos \phi/(P \cos \phi_1) = (T_2-T_4).$$

$$\cos \phi/(P \cos \phi_2) = (T_3-T_4).$$

$$\cos \phi/(P \cos \phi_3) = 2C.$$

* * * * *

UNITED STATES PATENT AND TRADEMARK OFFICE
CERTIFICATE OF CORRECTION

PATENT NO. : 4,850,247

DATED : July 25, 1989

INVENTOR(S) : David Yu

It is certified that error appears in the above-identified patent and that said Letters Patent is hereby corrected as shown below:

On the title page the inventor's address should read
-- 5814 Cleveland Street, Morton Grove, IL. 60053 --.

Signed and Sealed this

Thirteenth Day of February, 1990

Attest:

JEFFREY M. SAMUELS

Attesting Officer     Acting Commissioner of Patents and Trademarks